116,137

UNITED STATES PATENT OFFICE.

WILLIAM HENRY BALMAIN, OF ST. HELEN'S, GREAT BRITAIN.

IMPROVEMENT IN THE MANUFACTURE OF GLASS.

Specification forming part of Letters Patent No. 116,137, dated June 20, 1871.

*To all whom it may concern:*

Be it known that I, WILLIAM HENRY BALMAIN, of St. Helen's, Lancashire, Kingdom of Great Britain and Ireland, have invented certain Improvements in the Manufacture of Glass, of which the following is a specification:

*Nature and Object of Invention.*

My invention relates to an improvement in the manufacture of what is known as flint or white glass; and consists in the employment, with the usual ingredients of caustic alkali of the purity described hereafter, in place of carbonate or bicarbonate of potash or soda, which have hitherto been employed as prominent ingredients in the manufacture of glass of this character.

*General Description.*

The principal object of my invention is the production of a flint or white glass of a superior quality.

The ordinary caustic alkali of commerce contains about twenty per cent. of impurities, consisting of sulphate of soda, chloride of sodium, and other deleterious substances; and it is the presence of this large proportion of impurities which renders the ordinary caustic alkali unfit for use in carrying out my invention, which demands a caustic alkali the impurities of which do not exceed ten per cent.

The substitution of purified carbonate of soda for the alkali ordinarily used complicates the process and renders it expensive.

In carrying out my invention I mix caustic alkali with other ingredients of the usual character in the same manner as the carbonates are mixed with like ingredients, and melt the whole in the ordinary furnaces; or I mix the said caustic alkali roughly with the other ingredients, and then, by fluxing, make a conglomerate, which I afterward regrind to effect a more thorough admixture before the final melting; or I melt or otherwise combine with the caustic alkali one or more or a portion of one or more of the other ingredients, and afterward mix it with the remainder before the final melting.

The glass made in this manner is distinguishable from the ordinary glasses by the extreme cleanness and freedom from specks and cloudiness.

*Claims.*

1. The use of caustic alkali of the purity described in the manufacture of glass.
2. Glass produced by the use of a caustic alkali of the purity described.

In testimony whereof I have signed my name to this specification in the presence of two subscribing witnesses.

WILLIAM HENRY BALMAIN.

Witnesses:
    GEO. FREDK. CLARKE,
    EDWD. W. MILLER,
        *Both of 4 Cook street, Liverpool.*